United States Patent [19]
Dubeck et al.

[11] 3,896,208
[45] July 22, 1975

[54] HCL TREATMENT OF COPPER SULFIDE MINERALS

[75] Inventors: Michael Dubeck, Birmingham, Mich.; Leon Lech, Windsor, Canada

[73] Assignee: Ethyl Corporation, Richmond, Va.

[22] Filed: Mar. 29, 1973

[21] Appl. No.: 345,847

Related U.S. Application Data

[63] Continuation-in-part of Ser. No. 266,475, June 26, 1972, abandoned, which is a continuation-in-part of Ser. No. 255,833, May 22, 1972, abandoned.

[52] U.S. Cl............ 423/27; 75/101 R; 75/111; 75/114; 75/117; 423/34; 423/46; 423/150
[51] Int. Cl............ C22b 15/08; C22b 11/06
[58] Field of Search.......... 423/27, 28, 38, 39, 46, 423/150; 75/101 R, 111, 114, 117

[56] References Cited
UNITED STATES PATENTS

| | | | |
|---|---|---|---|
| 475,558 | 5/1892 | Herrenschmidt | 75/117 |
| 752,320 | 2/1904 | Alzugaray | 75/117 |
| 940,292 | 11/1909 | Wells | 75/117 |
| 981,451 | 1/1911 | McKechnie et al. | 75/101 R |
| 1,041,407 | 10/1915 | Alzugaray | 423/38 |
| 2,662,009 | 12/1953 | Roberts et al. | 75/117 |
| 3,174,849 | 3/1965 | Mackiw et al. | 75/117 |
| 3,288,597 | 12/1966 | Wilson | 75/117 |
| 3,459,535 | 8/1969 | Uizsolyi et al. | 75/101 R |

*Primary Examiner*—Oscar R. Vertiz
*Assistant Examiner*—Gary P. Straub
*Attorney, Agent, or Firm*—Donald L. Johnson; Robert A. Linn

[57] ABSTRACT

A hydrometallurigical process featuring treating sulfide metal concentrate with hydrochloric acid or hydrogen chloride gas and an oxygen-bearing gas (air or oxygen) in an aqueous medium to recover metal from said sulfide metal concentrate is disclosed.

22 Claims, 1 Drawing Figure

CHALCOPYRITE CONCENTRATE
Cu/Fe SOLUBILIZATION o = Copper
• = Iron

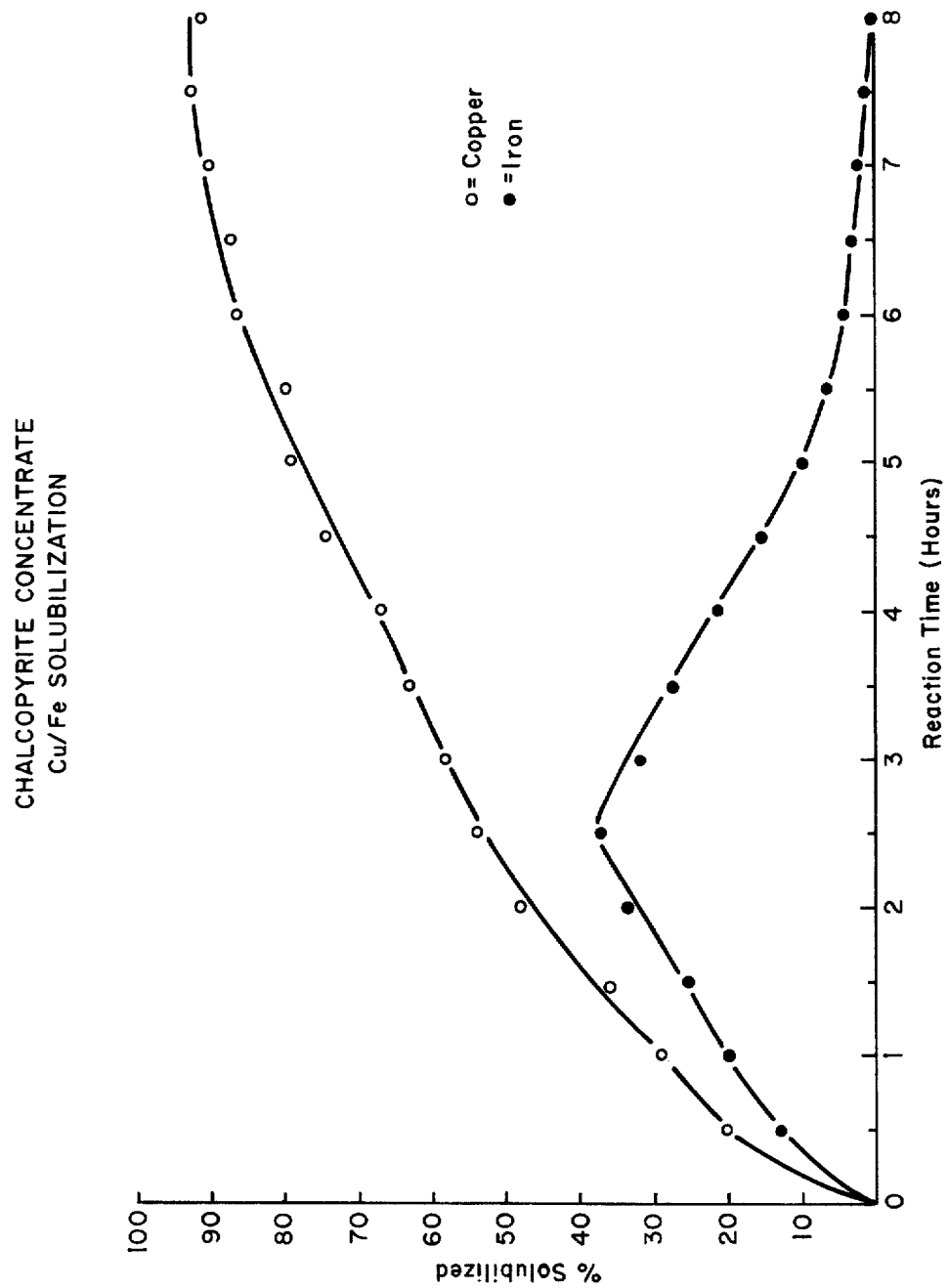

HCL TREATMENT OF COPPER SULFIDE MINERALS

CROSS REFERENCE TO RELATED APPLICATIONS

This application is a continuation-in-part of application Ser. No. 266,475, filed June 26, 1972, now abandoned, which in turn is a continuation-in-part of application Ser. No. 255,833, filed May 22, 1972, now abandoned.

BACKGROUND OF THE INVENTION

The present invention involves hydrometallurgical processes for recovering metal from sulfide metal minerals generally; and copper from sulfide copper concentrates more particularly.

Recovery of copper from sulfide copper minerals and concentrates can be achieved by pyrometallurgical or hydrometallurgical processes. In pyrometallurgical processes, the sulfide copper is initially oxidized with the formation of large amounts of sulfide dioxide as a by-product. Sulfur dioxide is an undesirable air pollutant which must be trapped, to minimize discharge into the atmosphere.

Hydrometallurgical processes on the other hand, generally involve leaching of the sulfide copper to recover the copper as a soluble salt. No evolution of sulfur dioxide occurs. Although a number of leaching agents are known, a popular hydrometallurgical process uses sulfuric acid, preferably in conjunction with an oxidizing agent, e.g., air or oxygen at elevated temperatures and superatmospheric pressures. In an especially efficient process, this leaching operation is carried out under pressure at temperatures above 120°C.

The present hydrometallurgical process features treating a sulfide copper concentrate with a hydrochloric acid or hydrogen chloride gas and an oxygen-bearing gas, e.g., air or oxygen, at atmospheric pressure and elevated temperatures preferably about 105°C. A substantially complete recovery of the copper from the sulfide copper concentrate can be achieved. In addition, free sulfur is also obtained as a by-product — and where iron is present in the concentrate, solubilization of iron can be minimized.

SUMMARY OF THE INVENTION

A process for recovering copper from sulfide copper mineral concentrates by treating said concentrate with hydrochloric acid or hydrogen chloride gas and an oxygen-bearing gas at atmospheric pressure and elevated temperatures in an aqueous medium, whereby a substantial amount of the copper is recovered as copper chloride solution — solubilization of iron, if present in the concentrate, can be minimized.

BRIEF DESCRIPTION OF THE DRAWING

A graph illustrating copper and iron solubilization of a chalcopyrite concentrate.

DESCRIPTION OF THE PREFERRED EMBODIMENTS

An embodiment of the present invention is a process for recovering copper from copper mineral concentrate which comprises treating said concentrate with hydrochloric acid or hydrogen chloride gas and air or oxygen in an aqueous medium, the treatment being carried out at atmospheric pressure and elevated temperatures (preferably about 100°–105°C.), then separating insoluble material from the treated slurry, thereby obtaining a solution containing a substantial amount of the copper contained in said concentrate as copper chloride. This separation can be carried out using any suitable procedure, for example, by filtration, by centrifugation, by decantation, and the like.

A preferred embodiment of the present invention is a process for recovering copper from sulfide copper mineral concentrates which comprises 1. preparing a water slurry of said concentrate, said concentrate having a particle size of about 100 mesh or smaller, and an acid material selected from hydrochloric acid and hydrogen chloride gas
2. treating said slurry with an oxygen-bearing gas, at atmospheric pressure and at temperatures of 75°C. to about 105°C. for about two or more hours, and
3. filtering the treated slurry from step (2) whereby a solution, containing 85% or more of the copper from said concentrate, as a copper chloride, is obtained. If said concentrate contains iron, the solubilization of iron can be minimized as is taught below.

It is more preferred to prepare the water slurry of concentrate and then to add hydrochloric acid or hydrogen chloride gas, portion-wise, to the slurry with the oxygen-bearing gas.

Any copper minerals can be utilized in the present process. Copper minerals of the sulfide type are preferred. Examples of sulfide copper minerals are covellite, enargite, tetrahedrite, tennantite, bornite, chalcopyrite, chalcocite, and the like.

The copper minerals occur in nature as copper ores. These copper ores are mixtures containing the copper bearing minerals and copper free minerals. Although the ore itself can be subjected to the present treatment process, it is preferred that a copper mineral concentrate be used. This concentrate is the product obtained when the copper mineral is separated from a substantial amount of the unwanted noncopper minerals in the ore. This concentrate is rich in the particular copper mineral or minerals found in the ore. The methods for concentrating copper ores are well-known to those skilled in the art.

A particularly useful concentrate is that obtained from sulfide copper ores and especially where the concentrate contains a substantial amount (80% or more) of chalcopyrite ($CuFeS_2$). The latter concentrates are also referred to as chalcopyrite concentrates.

The sulfide copper concentrates used in the present process are generally dispersed in water as a slurry. The concentrates of the sulfide copper concentrate in the slurry can range up to about 50% by weight or more. Slurry concentrates down to about 2% can be used. Slurry concentrates from about 15% to about 50% are preferred. More preferred slurries contain 25% to about 40% by weight of the sulfide copper concentrate.

For best results, it is preferred that the sulfide copper mineral or concentrate have a fineness of about 50 mesh and preferably 100 mesh and smaller when used in the present process. If desired, the acid-bearing material, for example, hydrochloric acid, can be added along with the water when preparing the slurry prior to heating it to reaction temperature and beginning the oxygen-bearing gas treatment.

The sulfide copper mineral or concentrate slurry is treated with an oxygen-bearing gas. This oxygen-bearing gas can be any mixture of gases containing a substantial amount of oxygen. Generally, air or oxygen is used. Oxygen is preferred.

The treatment with oxygen-bearing gas is ordinarily carried out at elevated temperatures. This temperature is also referred to as the reaction temperature. Temperatures as low as about 75°C. can be used. The upper temperature limit, when the gas treatment is carried out at atmospheric pressure, is at the boiling point of the system. This upper limit will vary depending on the concentration of soluble salts in the reaction mixture. About 105°C. can be considered a practical maximum temperature.

The treatment with oxygen-bearing gas must be carried out in the presence of acid-bearing material. Treatment time at the reaction temperature can be varied. Generally, the treatment with oxygen-bearing gas is allowed to proceed until the desired degree of copper recovery is achieved. Times up to 72 hours or more can be used. Ordinarily, treatment times are less than 24 hours and preferably from 4–16 hours.

The process is carried out at substantially atmospheric pressure. Pressures above atmospheric can be utilized, but are not required.

The amount of acid material used in the present process can be varied. In the case of hydrochloric acid, molar concentrations of hydrochloric acid:sulfide copper mineral ratios of up to 10:1 can be utilized. Molar ratios ranging from about 1:1 to about 6:1 are preferred; ranges from about 2:1 to about 3:1 are more preferred. When hydrogen chloride gas is used, a comparable concentration of HCl:sulfide copper mineral molar ratio should be maintained. The slurry treatment with oxygen-bearing gas should be continued for a time sufficient to solubilize 70%–80% or more, and preferably 90% –95% or more of the copper from the sulfide copper mineral. The following equations illustrate stoichiometry involved at various acid levels for chalcopyrite.

(A) $CuFeS_2 + 5 HCl + 5/4 O_2 \rightarrow CuCl_2 + FeCl_3 + 2 S° + 5/2 H_2O$ (B) $CuFeS_2 + 2 HCl + 5/4 O_2 \rightarrow CuCl_2 + 2 Fe_2O_3 + 2 S° + H_2O$ Using the following general procedures, a number of runs were made demonstrating the process of the present invention.

GENERAL PROCEDURE I

The apparatus used is 1 liter glass, creased, resin flask fitted with a thermometer, stirrer, fritted glass tube (extending to just above the bottom of the flask), a condenser, and a dropping funnel.

The flask is charged with sulfide mineral concentrate, water, and concentrated hydrochloric acid. The mixture is heated with stirring, to the desired reaction temperature. Oxygen is fed into this mixture during the heating cycle. The oxygen feed is continued at this reaction temperature for a number of hours. At the end of this time, the mixture is filtered. The residue is washed. The filtrate is cooled to room temperature, pH is taken and it is then diluted with water and 10 milliliters of hydrochloric acid to a total volume of one liter. This diluted filtrate plus the residue washings are analyzed for copper and iron content. The results are expressed as percent of copper and iron extracted from the sulfide mineral.

The residue obtained in the filtration is extracted with boiling carbon tetrachloride. The amount of elemental sulfur recovered from the process is obtained by evaporating the carbon tetrachloride solution and weighing the sulfur.

GENERAL PROCEDURE II

The same apparatus is used as in General Procedure I. The flask is charged with sulfide mineral concentrate, water and about 35% of the total hydrochloric acid (concentrated) to be added. This mixture is stirred and heated to the desired reaction temperature. When the reaction temperature is reached, about 15% of the acid to be charged is added and oxygen is fed into the stirred mixture. The remainder of the acid is fed in about 13% increments each hour, until all the acid has been added.

The reaction is continued for an additional hour and then the mixture is filtered. The filtrate and residue are treated as in General Procedure I.

Although General Procedure II sets out a definite increment of acid to be added over a definite period of time, it is not meant to be limiting. The procedure simply illustrates incremental addition of the acid material in the present process.

GENERAL PROCEDURE III

The same apparatus is used as in General Procedure I. This procedure differs from General Procedure I in that (a) only sulfide mineral concentrate and water are charged initially and heated with stirring to the reaction temperature, (b) no oxygen is fed into this mixture during this heating cycle, and (c) all of the concentrated hydrochloric acid is added and the oxygen feed is started after the reaction temperature is reached. The reaction is then continued and the product is recovered as in General Procedure I.

Data for a number of runs using these general procedures are provided in the following table. In the table, slurry concentration is given. The slurry concentration is based on total liquid charged.

The concentrate used in each run was chalcopyrite concentrate (assay 80% or more as $CuFeS_2$).

Table I

| | | | Copper Recovery From Chalcopyrite Concentrates | | | | | | | | |
|---|---|---|---|---|---|---|---|---|---|---|---|
| Run | General Procedure used | $CuFeS_2$[1] (millimoles) | HCl (millimoles) | Slurry %[5] | $O_2$ Flow (1 cc/min.) | Reaction Temp. (°C.) | Reaction Time (hrs.) | % Cu | Product Recovered | | |
| | | | | | | | | | % S | % Fe | pH |
| 1 | I | 176 | 880 | 15 | 1490[4] | 99 | 5 | 92.0 | 76.1 | 83.7 | — |
| 2 | I | 176 | 880 | 15 | 1490 | 96–104 | 5 | 89.2 | 77.5 | 84.2 | <0 |
| 3 | I | 165 | 495 | 15 | 1490[4] | 96–97 | 6 | 87.8 | 62.3 | 42.2 | 0.85 |
| 4 | I | 165 | 495 | 15 | 1490[4] | 97 | 6 | 86.7 | 64.5 | 37.9 | 0.85 |
| 5 | I | 330 | 990 | 50 | 1490 | 99 | 6 | 88.8 | — | 30.0 | 0.7 |
| 6 | I | 330 | 990 | 50 | 1490 | 99–103 | 8 | 94.3 | 80.1 | 24.2 | 0.51 |

Table I — Continued

| Run | General Procedure used | CuFeS$_2$[1] (milli-moles) | HCl (milli-moles) | Slurry %[5] | O$_2$ Flow (1 cc/min.) | Reaction Temp. (°C.) | Reaction Time (hrs.) | Product Recovered % Cu | % S | % Fe | pH |
|---|---|---|---|---|---|---|---|---|---|---|---|
| 7 | I | 351 | 990 | 50 | 1490 | 99–102 | 8 | 95.0 | 57.5 | 5.4 | 1.0 |
| 8 | I | 342 | 990 | 50 | 1490 | 100–103 | 8 | 96.3 | 70.5 | 28.7 | 0.06 |
| 9 | I | 435 | 1254 | 30 | 1490 | 98.5–101 | 6 | 90.3 | 83.5 | 54.9 | 1.4 |
| 10 | II | 406 | 1218 | 35 | 1490 | 96–97 | 8 | 97.7 | — | 39.2 | <0 |
| 11 | III | 88 | 176 | 4 | 1490 | 96 | 4 | 78.5 | 68.5 | 14.3 | — |
| 12 | III | 88 | 176 | 4 | 1490 | 96 | 4 | 85.6 | — | 11.6 | — |
| 13 | III | 88 | 264 | 4 | 1490 | 96 | 5 | 100.0[2] | — | 42.4 | — |
| 14 | III[3] | 88 | 88 | 4 | 1490 | 96 | 4 | 13.0[2] | — | 8.26 | — |

[1] The particle size range of the chalcopyrite concentrate was about 200 mesh or smaller.
[2] Approximate - analysis obtained on aliquot withdrawn from system at reaction time indicated.
[3] Acid used was concentrated sulfuric acid instead of HCl - a comparative example.
[4] Oxygen was preheated.

[5] Examples 1–10 calculated as Slurry % = $\dfrac{\text{wgt. of sulfide mineral concentrate}}{\text{wgt. of total liquid charged}} \times 100$ Examples 11–14 calculated as Slurry % = $\dfrac{\text{wgt. of sulfide mineral concentrate}}{\text{wgt. of sulfide mineral concentrate} + \text{wgt. of total liquid charged}} \times 100$ The data in Table I clearly shows how effectively copper is extracted from sulfur copper minerals using the present process. From Run 14, we can also see that H$_2$SO$_4$ is substantially ineffective in the present process.

In addition to extracting copper, the data shows that the present process also provides a means for recovering elemental sulfur from the sulfide copper minerals.

Comparable results can be obtained with procedures of the type described above (1) using sulfide copper minerals and concentrates other than chalcopyrite or mixtures containing less than about 80% chalcopyrite, (2) when the process is carried out at temperatures of 75°C., 80°C., or 85°C., (3) using HCl gas instead of or in conjunction with hydrochloric acid, (4) at sulfide mineral:HCl molar ratios of 1:1 or 1:6, and (5) using air instead of oxygen as the treating gas.

Recovery of copper from the copper sulfide solutions obtained in the present process can be achieved by known processes, for example, by cementation, by electrolysis.

The present process can be carried out as a batch process, a staged-batch process, a semi-continuous process or as a continuous process. By staged batch we mean sequential treatment of the sulfide mineral residue in a series of steps in which only a portion of the copper contained in the mineral is extracted in each of the steps. Although such a staged-batch procedure may produce more dilute copper solution, a more complete extraction of copper from the mineral can be achieved.

Another advantage of the present process is that because it can be carried out at atmospheric pressure, no costly, pressure resistant process equipment is required. The process equipment can be of any material which (1) is resistant to acid solutions encountered, and (2) will withstand the reaction temperature. Suitable materials are wood, glass coated materials, polyfluorinated resin coated materials, metal alloys, carbon metals such as titanium, thermoplastic or thermoset resins, carbon and the like.

The present process can also be utilized to recover metals from other minerals, from oxide copper minerals, either alone or in admixture with sulfide copper minerals. Thus, minerals containing iron, nickel, zinc, lead, molybdenum, cobalt, gold, silver, rhenium and mixtures thereof either alone or admixed with copper minerals can be treated by this process. Examples of these other minerals and oxide copper minerals are chrysocolla (CuSiO$_3$·2H$_2$O), malachite [Cu$_2$CO$_3$·(OH)$_2$], azurite [Cu$_3$(CO$_3$)$_2$], cuprite (Cu$_2$O), tenorite (CuO), pyrite (FeS$_2$), sphalerite (ZnS), calamine [Zn$_2$(OH)$_2$SiO$_3$], smithsonite (ZnCO$_3$), molybdenite (MoS$_2$), wulfenite (PbMoO$_4$), molybdite (FeO$_3$·3MoO$_3$·7H$_2$O), galena (PbS), cerussite (PbCO$_3$), nickel sulfide (Ni$_3$S$_2$), cobalt sulfide and rhenium sulfide.

To demonstrate the effectiveness of the present process with concentrates containing minerals in addition to sulfide copper and sulfide iron, an ore concentrate (Concentrate B), having the following composition, was treated according to General Procedure (I).

Concentrate B Composition

A) Principal Minerals
  Cubanite —Cu$_2$S·Fe$_4$S$_5$
  Chalcopyrite —CuFeS$_2$
  Pentlandite —(Ni,Fe)$_9$S$_8$
  Pyrite —FeS$_2$
  Pyrrhotite —Fe$_x$$^-$$_1$S$_x$
B) Typical Cu and Ni Content
  Cu — to about 12%
  Ni — to about 5%
C) Average Assay, One Sample
  Cu = 12.5%
  Ni = 2.68%
  Fe = 32.8%
  Insolubles = 22.6%
  S = 24.4%
  Co = 0.14%
  C = 0.81%

As the assay shows, the concentrate also contains a minor amount of a cobalt mineral. The assay values and typical Cu and Ni content are illustrative and not meant to be limiting.

The valuable metals in this concentrate are copper, nickel, and cobalt.

The recovery results from the aforesaid treatment of Concentrate B are presented in Table II.

TABLE II

| Run | Concentrate B (1) (grams) | Product Recovery From Concentrate B | | | | | Product Recovered | | | | |
|---|---|---|---|---|---|---|---|---|---|---|---|
| | | HCl (2) (mls) | Slurry (3) % | $O_2$ Flow (cc/min) | Reaction Temp. (°C.) | Reaction Time (hrs) | % Cu | % Ni | % Co | % S | % Fe |
| 15 | 44.12 | 22.1 | 15 | 1490 | 95 | 8 | 97.3 | 99.0 | 100 | 80.2 | 0.22 |

(1) Assay = Cu = 12.8%; Ni = 2.12%; Co = 0.11%; S = 24.8%; Fe = 31.3%; Ca = <0.01%; insolubles = 20.2%
Fineness = <200 mesh (2) 11.82 M HCl (3) $\dfrac{\text{Weight of Concentrate B}}{\text{Weight of Concentrate B plus weight of total liquid charged}} \times 100$ The data in Table II shows that substantially all of the copper, nickel, and cobalt values were recovered from Concentrate B, while substantially none of the iron in the concentrate was solubilized. This selective recovery of the metals (and particularly avoidance of solubilizing the iron) is not only unexpected but is highly desirable, and has an important practical significance. The practical significance is that without soluble iron in the mixture, the final recovery and separation of the copper, nickel, and cobalt metals from the mixed solution is simplified and facilitated. Furthermore, iron recovered from solubilized iron is too expensive to be of significant value.

Similar results are obtained when Concentrate B is treated according to General Procedure II or III. As pointed out above, the present process can be carried out as a continuous process, a semi-continuous process, staged-batch, or batch.

As pointed out above, an advantage of the present system is that copper can be solubilized from a chalcopyrite concentrate with mineral solubilization of the iron in such a concentrate. This substantial selectivity for extracting copper is achieved by maintaining a certain effective molar ratio of HCl:Cu (in the chalcopyrite). This ability to reduce solubilization of iron is of considerable significance since soluble iron in solutions containing soluble copper adversely affects recovery of the copper from such a solution.

A keye to selectively extracting copper while preventing solubilization of the iron in chalcopyrite is the effective molar ratio of HCl:Cu (in the chalcopyrite). To effect the desired selective extraction of copper an effective molar ratio of HCl:Cu (in the chalcopyrite) must be in the range of about 1.5:1 to about 2.4:1 — with about 1.8:1 to about 2.2:1 being preferred, and about 2.0:1 to about 2.1:1 being most preferred. By effective ratio, we mean that should the chalcopyrite containing concentrate contain any HCl consumers other than the chalcopyrite, e.g. calcium carbonate, CaO, carbonate minerals, MgO, other HCl susceptible minerals, or flotation agents, and the like, a sufficient amount of HCl is initially provided to take care of these additional acid consumers and still have enough HCl remaining so that a molar ratio of HCl.Cu (in the chalcopyrite) is in the aforesaid effective ranges. Thus, where a chalcopyrite concentrate contains other acid consumers, e.g., calcium oxide, calcium carbonate, cuprous sulfide, a silver mineral, cobalt mineral, nickel mineral, etc., then excess HCl must be provided for these components so that sufficient HCl remains to have an HCl:Cu (in the chalcopyrite) ratio in the 1.5:1 to 2.4:1 range.

The reaction conditions used for carrying out this selective leaching of copper from the sulfide copper mineral, chalcopyrite are generally as set out above in the General Procedures. The chalcopyrite containing mineral concentrate is generally ground to a fineness of 100 mesh and preferably 300 mesh or smaller. This ground concentrate is then slurried in an aqueous medium which can be water to which the acid material is subsequently added — or more conveniently it is an aqueous HCl solution. This slurry is then heated to the desired reaction temperature while introducing air or preferably oxygen through the slurry. Agitation is also generally provided. This treatment process is generally carried out at atmospheric pressure. Pressures of above atmospheric may be used, but are not necessary. The treatment is carried out for a time sufficient to extract a substantial amount of the copper as a soluble salt while minimizing the amount of iron solubilized. Time of treatment will vary depending on the nature of the concentrate, the slurry concentration, the particle size of the concentrate, the temperature used, whether air or oxygen is used as the oxygen bearing gas and other system variables, such as stirring rate.

To demonstrate the critical significance of the effective ratio of HCl:copper (in the chalcopyrite) on minimizing iron dissolution from chalcopyrite, data is presented in the following table. The leaching procedure used was substantially the same as that described above under General Procedure I. The concentrates used contained chalcopyrite ($CuFeS_2$) as the principal mineral.

Table III

| | | Effect Of Molar Ratio Of HCl:Cu (In Chalcopyrite) On Minimizing Iron Dissolution | | | | | |
|---|---|---|---|---|---|---|---|
| Run (1) | Concentrate (2) Slurry (%) | Effective Molar Ratio HCl:Cu | $O_2$ Flow (3) (cc/min.) | Reaction Temp. °C.) | Soluble Cu and Fe in Final Solution (4) | | Final Solution pH |
| | | | | | Cu% | Fe% | |
| 1 | 15 | 1.8 : 1 | 1500 | 96 – 98 | 100 | 0.3 | 3.15 |
| 2 | 15 | 2.07 : 1 | 1500 | 96 – 98 | 98.6 | 0.03 | 1.95 |
| 3 | 15 | 2.14 : 1 | 1500 | 96 – 98 | 95.2 | 2.8 | 1.95 |
| 4 | 15 | 2.50 : 1 | 1500 | 96 – 98 | 99.5 | 27.8 | 1.05 |

Table III-Continued

Effect Of Molar Ratio Of HCl:Cu (In Chalcopyrite) On Minimizing Iron Dissolution

| Run (1) | Concentrate (2) Slurry (%) | Effective Molar Ratio HCl:Cu | O₂ Flow (3) (cc/min.) | Reaction Temp. °C. | Soluble Cu and Fe in Final Solution (4) Cu% | Fe% | Final Solution pH |
|---|---|---|---|---|---|---|---|
| 5 | 15 | 2.07 : 1 | 1500 | 98 | 96.8 | Neg. (5) | 2.75 |
| 6 | 33 | 2.89 : 1 | 1490 | 100 – 103 | 96.3 | 28.7 | 0.06 |
| 7 | 15 | 2.1 : 1 | 1490 | 95 – 97 | 93.3 | 1.2 | 2.10 |

(1) The reaction time for each run was 8 hours.
(2) (a) For Runs 1–4 and 7, chalcopyrite concentrate A was used
assay was Cu = 29.5%; Fe = 27.8%; S = 32.0%-mineral
ratio CuFeS$_2$: FeS$_2$ = 1:0.06
(b) For Runs 5 and 6, chalcopyrite concentrate BG was used -
assay was Cu = 26.7%: Fe = 27.5%; S= 32.6%; Ag = 66 ppm
(3) Approximate
(4) % of total Cu and Fe in concentrate
(5) Negligible amount The data in Table III quite clearly illustrates that within a certain HCl:Cu (in the chalcopyrite) molar ratio range, copper is preferentially leached from a chalcopyrite containing concentrate while minimizing dissolution of iron.

The accompanying figure graphically illustrates the dissolution rate of Run 7, which is considered typical of a preferred process of the present invention. As the graph shows, after about 50% of the copper in the concentrate is solubilzed, the amount of soluble iron in the solution begins to decrease while the solubilization of the copper increases. When about 70% of the copper is solubilized, less than about 20% iron is in solution. As the treatment is continued, after about 90% of the copper is solubilized, less than about 6% of the iron is in solution. At the end of eight hours, less than 1% of iron is in solution while more than 90% of the copper is solubilized. Thus, the graph illustrates that treatment time is an important factor in the present preferred process.

A concentrate containing chalcopyrite as the primary mineral with small amounts of silver and gold bearing minerals was also subjected to the leaching method of the present invention. Again, the general procedure used was substantially that described as General Procedure I above. The results obtained from this leaching of concentrate are presented in the following table.

Table IV

Leaching of IC. Concentrate (1)

| Run (2) | Slurry (3) % | Effective Molar Ratio HCl:Cu | Soluble Cu, Fe, Au and Ag In Final Solution Cu | Fe | Ag | Au | Final Solution pH |
|---|---|---|---|---|---|---|---|
| A | 15 | 2.07:1 | 97% | S.N. (4) | 87.0% | S.N. | 3.25 |
| B | 20 | 2.17:1 | 93% | 1.6% | 86.5% | S.N. | 2.00 |

(1) IC concentrate assay was Cu = 25.1%; Fe = 24.5%; S = 28.3%; Ag = 36 ppm;
Au = 8.8 ppm; Mg = 0.34%; Ca = 0.71%; Mo = 0.41%; As = 0.1%
(2) Reaction time for each Run was 8 hours, O$_2$ flow was about 1500 cc/min. and the reaction temperature was 96°C.
(3) Concentrate particle size, 97% through 325 mesh
(4) S.N. = substantially none As the data indicates in Table IV, a substantial amount of the silver contained in the concentrate is solubilized along with the copper while still maintaining minimal iron dissolution.

Claims to the invention follow.

We claim:

1. A process for recovering copper from sulfide copper mineral concentrate which comprises
   1. treating said concentrate with (a) an acid material selected from the group consisting of hydrochloric acid, hydrogen chloride gas and mixtures thereof, and (b) an oxygen-bearing gas, said treatment being carried out, in an aqueous medium with said concentrate in slurry form, at about atmospheric pressure, at temperatures of from about 75°C. to about 105°C. to solubilize the copper from said concentrate,
   2. separating insoluble material from the aqueous system obtained in step (1),
   whereby (a) a solution is obtained containing copper as copper chloride, and (b) said insoluble material contains sulfur as free sulfur.

2. The process of claim 1 wherein said concentrate contains chalcopyrite.

3. The process of claim 1 wherein step (1) is carried out by (i) preparing a slurry of said concentrate in water and said acid material and (ii) treating said slurry with oxygen-bearing gas.

4. The process of claim 1 wherein said oxygen-bearing gas is oxygen.

5. The process of claim 1 wherein said mineral concentrate contains (1) as principal minerals, chalcopyrite, cubanite, pyrrhotite, pentlandite, and pyrite, and (2) minor amount of cobalt mineral.

6. The process of claim 5 wherein said solution additionally contains nickel and cobalt as nickel chloride and cobalt chloride.

7. The process of claim 1 wherein said step (1) is carried out by (i) preparing a water slurry of said concentrate and (ii) treating said slurry with said acid material and said oxygen-bearing gas.

8. The process of claim 7 wherein said acid material is added incrementally during the treatment along with said oxygen-bearing gas.

9. The process of claim 7 wherein said slurry contains from about 2% to about 50% by weight of said concentrate.

10. The process of claim 1 wherein said concentrate has a particle size of up to about 100 mesh.

11. The process of claim 10 wherein said acid material is hydrochloric acid and wherein the molar ratio of sulfide copper mineral:hydrochloric acid is from about 1:1 to about 1:6.

12. The process of claim 11 wherein said sulfide copper mineral is chalcopyrite and wherein said oxygen-bearing gas is oxygen.

13. The process of claim 11 wherein said ratio is from about 1:3 to about 1:5 and said temperature is about 105°C.

14. The process of claim 11 wherein said ratio is from about 1:2 to about 1:3 and said temperature is about 105°C.

15. A process for selectively extracting copper from chalcopyrite concentrate which comprises
   1. treating said concentrate with (a) an acid material selected from the group consisting of hydrochloric acid, hydrogen chloride gas and mixtures thereof, and (b) an oxygen-bearing gas, in an aqueous medium with said concentrate in slurry form, providing sufficient acid material so that an effective molar ratio of Cu:HCl in said chalcopyrite, of between about 1:1.5 and 1:2.4 is obtained,
   2. carrying said treatment out at temperatures of from about 75°C. to about 105°C. at about atmospheric pressure is solubilize at least about 70% of the copper from said chalcopyrite concentrate,
   3. then separating insoluble material from said step (2) aqueous system whereby (a) a resultant solution is obtained containing soluble copper as copper chloride, and (b) undissolved material contains sulfur as free sulfur.

16. The process of claim 15 wherein said concentrate has a particle size of up to about 100 mesh.

17. The process of claim 15 wherein said acid material is hydrochloric acid.

18. The process of claim 15 wherein said oxygen-bearing gas is oxygen.

19. The process of claim 15 wherein at least about 90% of the copper from said chalcopyrite is extracted in step (2).

20. The process of claim 19 wherein said Cu:HCl ratio is from about 1:1.8 to about 1:2.2.

21. The process of claim 20 wherein said chalcopyrite concentrate also contains a silver bearing mineral and said resultant solution contains silver as a soluble salt.

22. The process of claim 1 wherein said acid material is hydrochloric acid.

* * * * *

UNITED STATES PATENT AND TRADEMARK OFFICE
CERTIFICATE OF CORRECTION

PATENT NO. : 3,896,208
DATED : July 22, 1975
INVENTOR(S) : Michael Dubeck et al

It is certified that error appears in the above—identified patent and that said Letters Patent are hereby corrected as shown below:

Page 1, under "Abstract" - line 1 - "hydrometallurigical" should be -- hydrometallurgical --

Column 7, line 38 - "mineral" should be -- minimal --

Table III, bridging Columns 9 and 10, notation (2) (b) - "Fe = 27.5%" should be -- Fe = 27.4% --

Signed and Sealed this twentieth Day of April 1976

[SEAL]

Attest:

RUTH C. MASON
Attesting Officer

C. MARSHALL DANN
Commissioner of Patents and Trademarks